Feb. 15, 1927.  
H. C. HEYNEMANN  
APPARATUS FOR EXAMINING VEHICLE TIRES  
Filed April 12, 1926
1,617,758
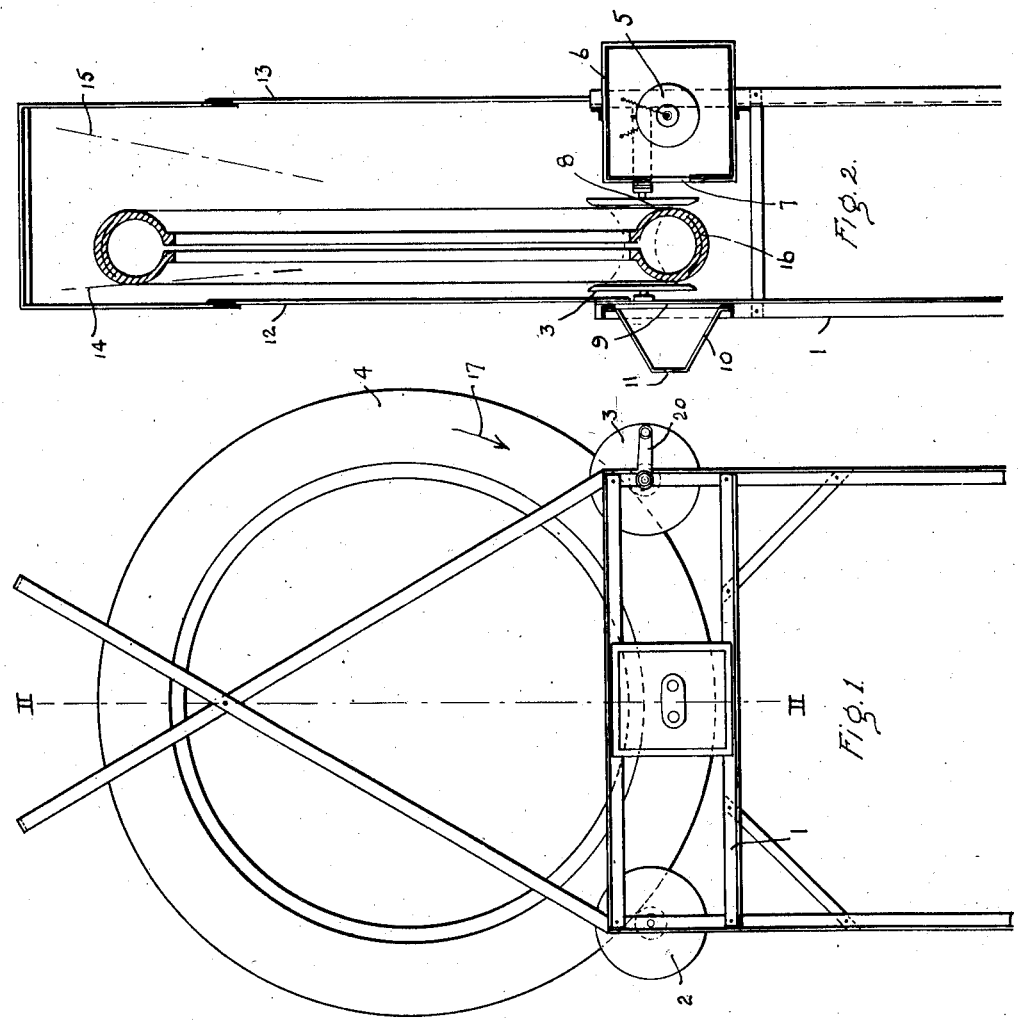
Inventor Patented Feb. 15, 1927.

1,617,758

UNITED STATES PATENT OFFICE.

HENRY C. HEYNEMANN, OF SAN FRANCISCO, CALIFORNIA.

APPARATUS FOR EXAMINING VEHICLE TIRES.

Application filed April 12, 1926. Serial No. 101,303.

My invention has for its object apparatus by which vehicle tires and the like may be readily examined to discover hidden defects and especially to discover and locate foreign bodies embedded in the tire material.

It is particularly adapted to the examination of automobile tire casings and by its use tacks, nails, pieces of wire or metal may be most readily located as may also other structural defects and injuries in the fabric, also sand pockets, pebbles or the like which have worked their way into the body of the casing.

It is also adapted to the discovery of pinched tubes, folded flaps, slipped boots and the like and in such case the examination is preferably made on the assembled casing and tube while mounted on the vehicle wheel.

By referring to the drawing my invention will be made clear.

Fig. 1 is a front view of the apparatus of my invention.

Fig. 2 is a section through Fig. 1 on the line II—II thereof.

Throughout the figures similar numerals refer to identical parts.

A supporting frame is shown by the numeral 1, having a pair of laterally spaced rotatable spools 2, 3, adapted to receive and on which may be rolled the vehicle tire 4. A crank, 20, may be fitted to one of these spools to facilitate rotating the tire if desired.

Between the spools 2, 3, on one side of the tire and supported from the frame, is the X-ray tube 5, preferably enclosed in a lead lined box 6, having a restricted front opening 7, through which X-rays from the tube 5 impinge against the side of the tire casing at 8.

In lieu of the lead lined box 6, other protective screens or conventional lead shield may be employed.

On the opposite side of the tire, from the tube 5, is a fluoroscopic screen 9, having the visor 10 with an aperture 11, for observing the screen.

Upstanding from the frame 1 are the standards 12, 13, preferably spaced apart a distance materially greater than the width of the tire so that the tire may be rocked from side to side as indicated by the lines 14, 15.

The operation is as follows:

The X-ray tube is energized by any suitable source of electricity not shown but well known.

A tire to be examined is placed upon the spools 2, 3, in the position shown and the operator takes up his position in front of the visor 10.

The tube is energized, and by observing the shadow or image of the tire on the fluoroscopic screen 9, the inner structure of the tire is readily observed.

The lower portion of the casing at 16 is readily available to be marked by chalk or other indication in any spot which corresponds with a hidden defect.

The tire 4 is rotated during observation as by the crank 20, upon the spools 2, 3, as in the direction of the arrow 17, thus bringing under observation every portion of the tire annulus.

When any defect is discovered, it may be identified as upon the front or back portion, by rocking the tire between the lines 14, 15, by the hand, a mark is then made on the outside of the casing as at 16.

It is not necessary in the use of my apparatus, to demount the tire from the wheel, although in the figures, I have shown a tire casing only. A vehicle wheel with the tire including the inner tube as well as the outer casing in assembled relation, may be examined in the same manner.

In this way a pinched inner tube may be readily discovered or foreign material as gravel, sand or the like, which has worked its way between the inner tube and the casing, or has not properly been cleaned out before inserting an inner tube, may be discovered. Thus, after a tire has been repaired and is ready to go back on the vehicle, it may be examined to be sure that no tacks, pieces of wire, gravel, or the like still remain and that the inner tube is free from folds or pinches, that the flap between the inner tube and the casing lies properly and that the finished assembled tire is in perfect condition. My apparatus may be employed with the plane of the tire either vertical or horizontal or in any other plane.

While I have shown but one form of my apparatus, it will be readily understood that variations in the structure, adjustment and arrangement of the parts may be employed to suit the taste and requirements of individuals without departing from the spirit of my invention and I desire to be understood as claiming the mechanical equivalents of the apparatus here shown.

I claim:

1. Apparatus for examining vehicle tires, comprising a frame, a plurality of rotative spools on said frame adapted to support a tire, an X-ray tube and a fluoroscopic screen between a pair of said spools and spaced apart to admit a portion of said tire therebetween when the tire is mounted to rotate on said spools.

2. Apparatus for examining vehicle tires, comprising a frame, a plurality of rotative spools on said frame adapted to support a tire, an X-ray tube and a fluoroscopic screen between a pair of said spools and spaced apart to admit a portion of said tire therebetween when the tire is mounted to rotate on said spools, frame members extending on each side of said tire and spaced apart a greater distance than the width of the tire to admit of the tire being rocked on the spools while in any of its rotated positions.

HENRY C. HEYNEMANN.